A method and apparatus for providing power to an electrostatic device includes a monitor and control system that prevents inadvertent and damaging electrical arcing. When the electrostatic device is first energized, voltage is gradually increased and the flow of electrical current is closely monitored. In the event the device is too close to ground or a grounded object, current flow exceeds a predetermined threshold and power is disconnected from the electrostatic device. Later, as the device voltage is increased to operating voltage, electrical current delivered to the electrostatic device is monitored for excessive current and excessive rate of change. If either fault condition is detected, power supply voltage may be reduced or disconnected, depending upon the severity of the fault. A microprocessor control system is illustrated for implementing the invention, including hardware and various software algorithms that provide the requisite gathering of information, analysis and responsive actions.

24 Claims, 16 Drawing Sheets

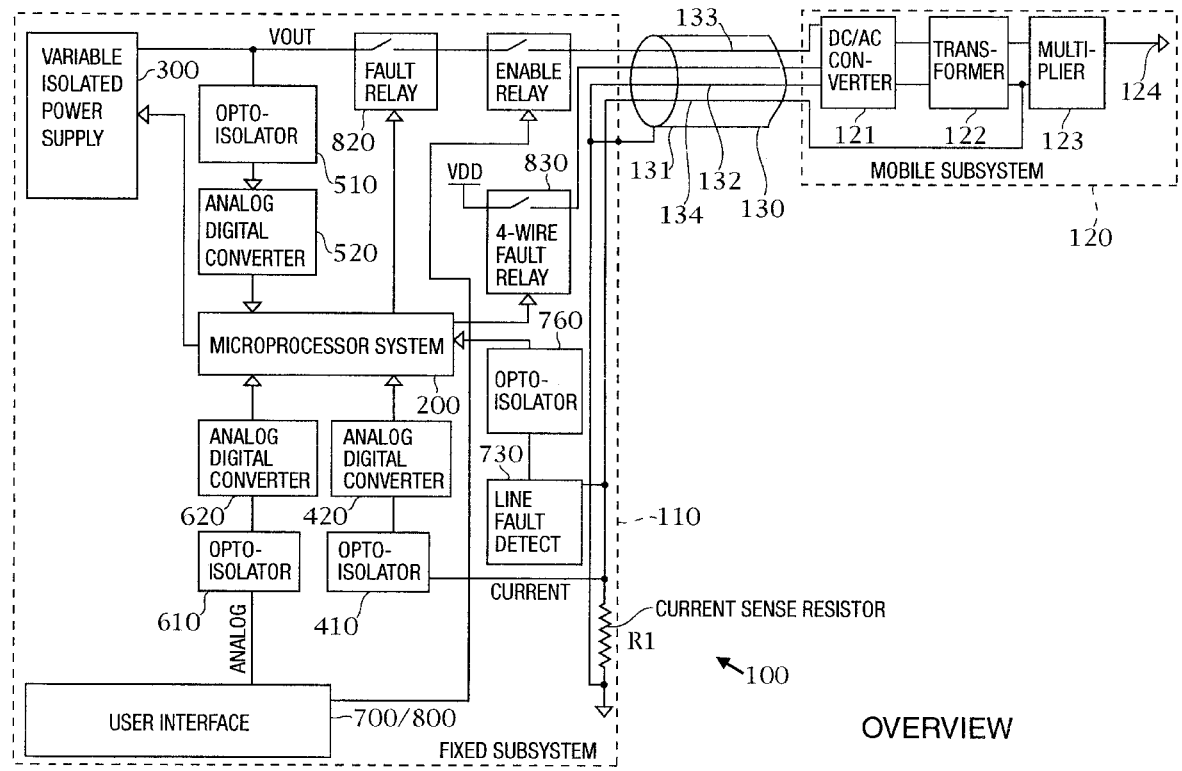

OVERVIEW

OVERVIEW

MICROPROCESSOR
SYSTEM

VARIABLE POWER SUPPLY
CONTROL

CURRENT ANALOG TO DIGITAL CONVERSION

REMOTE ANALOG TO DIGITAL CONVERSION

MISC. INPUT SIGNALS

COMMUNICATIONS INTERFACE

METHOD AND APPARATUS FOR CONTROLLING POWER SUPPLIED TO AN ELECTROSTATIC DEVICE

BACKGROUND OF THE INVENTION

1. Field of the Invention

This invention pertains to electrostatic devices generally, and in one specific preferred embodiment pertains to arc and fault prevention in electrostatic coating processes.

2. Description of the Related Art

Electrostatic devices have been used in a wide array of applications and environments. Electrostatic paper handlers and toner transfer systems are found in office equipment such as copiers and printers. In a manufacturing environment, many painting and coating processes are very dependent upon performance achievable only with the electrostatic process. A common feature of primary applications for electrostatic devices is the need to move or transfer material as perfectly as possible from one location to another. In painting or coating systems, a source feed is provided to the device. The feed material may be a liquid or powder, and it may be heated, be at ambient or even be cooled. The source feed is generally mixed with gas and expelled from a nozzle. During expulsion, particles within the mixed feed are charged electrically with a substantial voltage potential. A receiving surface is also charged to a high potential, but of opposite polarity, or to ground as is generally done in the automobile industry. As is known, the voltage differential provides substantial force of attraction between the charged particles and receiving surface. As a result, the charged particles are drawn to the receiving surface, even if they were otherwise propelled in a different direction.

For those unfamiliar with the strength of electrostatic forces, the Common grade school trick of rubbing a balloon against one's hair provides force ample to maintain the balloon suspended against the ceiling, even when the balloon itself is well beyond providing any significant buoyancy. Often, electrostatic forces will cause a person's hair to literally stand on end. These events occur with large objects, such as hair and balloons, that are relatively massive when compared to fine particles emitted from an atomizer, fine sprayer or the like. Consequently, electrostatic forces have proven to be valuable when working with relatively fine particles, and, in some instances, even when working with larger objects. Unfortunately, several drawbacks are present in the prior art systems that tend to limit the application of this technology. Electric arcs are very destructive. Energy density within an arc is so great that an extremely high temperature plasma is formed. There are very, few materials that are resistant to a plasma, and, as a result, plasma from an arc can destroy not only the coating material, but also the product which is being coated, and the high dissipation of energy can be adverse to the electrostatic device as well. An electric arc is also a fire and explosion hazard, even with materials that would not normally be considered to be particularly flammable or explosive. In electrostatic coating processes such as paint spraying, many paints have some level of combustibility and some are highly combustible. As a result of the risk of explosion, many painting applications are not considered suitable for electrostatic processes. These problems related to arcing may be her compounded by the geometry of the product being coated. All too often, the product to be coated is quite irregular in shape. A sharp edge, a pointed region, or even just a significant protrusion can greatly increase the chances of a voltage breakdown. Similarly, reducing the distance between the electrostatic sprayer and the work too much, such as might occur during a brief lapse in operator concentration, will result in a breakdown of the dielectric, and an arc will result. Beyond arcing, electrostatic devices have traditionally had another shortcoming. When the device or equipment is powered up or turned on, the device may electrically be short-circuited. This can happen when the operator puts the device down in order to switch power on, or when, at the of the previous work day the operator set the device down in a poor location, Or it can happen if the device is accidentally displaced, such as by being bumped or accidentally dropped. When the operator starts the electrostatic device, the device immediately overloads, in some cases destroying the equipment and also the work surface. Unfortunately, the operator may only then realize that the device was resting against an electrical ground. All components involved in this unfortunate situation, including the power supply, sprayer, and underlying component substrates, may be damaged. Faced with this dilemma, there have been some alternatives proposed, none which are fully satisfactory. For example, a first alternative is to use a robotic device designed to carry an electrostatic sprayer. The robotic device is programmed to work with a specific product where it will follow a specific surface contour. This requires an initial, expensive purchase of the robot, and further requires significant programming before the robot may be used. Nevertheless, if the robotic device is installed in a high volume production line, the expense and time incurred may be justifiable when amortized across many parts to be produced.

Unfortunately, the distance between the electrostatic coating device and work, and geometry of the work are only two factors that affect likelihood of arcing. Ambient conditions such as temperature and humidity are also known to have a substantial effect, such that on any given day, the probability for arcing may be higher or lower, and may also depend upon the source feed. Changes in source feed from a manufacturer may be difficult or impossible to predict or control, and the ambient conditions may also be difficult or impossible to control, depending upon the particular manufacturing environment. As a result, robotic systems have found greatest application in consistent or artificially controlled environments; where volumes are high enough to offset the difficulty and expense of acquiring and programming the robot; and where variances in source feed or ambient have a minimal impact on the operation of the device, such as with a few select materials and products.

A second alternative that reduces the likelihood of arcing is to simply reduce the voltage supplied to the electrostatic device. If the voltage is reduced, the probability of an inadvertent arc is also reduced. However, simply reducing the voltage does not help where a higher voltage is desirable or necessary for effective coating. Furthermore, lowering the voltage does not help an operator who may be traversing a flat surface without problem, who unknowingly encounters an unforeseen sharp protrusion. As aforementioned, a sharp protrusion or edge will greatly increase the probability of an arc. Therefore, there is a great need for an electrostatic power source which is capable of preventing destructive electrical arcing and which will protect the system against accidental short-circuiting. Unfortunately, in many applications of the prior art, the substantial benefits of the electrostatic device have remained heretofore untapped.

SUMMARY OF THE INVENTION

In a first manifestation of the invention, a computerized apparatus controls power supplied to a high-voltage, low current output electrostatic device. The apparatus provides intelligent fault detection and arc prevention, and is readily adjusted and adapted to varying environmental conditions and various applications. A user interface is provided for entering control parameters and receiving status indication, and may take the form of various display panel components, serial communications channels, Ethernet interfaces or other suitable arrangements. A variable power supply is provided with a control input and a variable voltage output, and an electrical conductor electrically interconnects the variable voltage output to the electrostatic device. A means for sensing the variable voltage output and a means for sensing high-voltage, low current output from the electrostatic device each provide an output signal indicative of magnitude to a microprocessor system. Using both hardware and programs in response to output voltage, output current, and control parameters, the microprocessor system adjusts the variable power supply through the control input to remediate fault conditions, thereby preventing arcs and other damaging fault conditions from adversely affecting the computerized apparatus.

The invention also comprises a method for preventing arcs or destructive fault conditions from damaging an electrostatic device.

Power is provided to the electrostatic device for high voltage applications and includes a current component of the high voltage. Predetermined limits are established for a rate of change of the current component. At predetermined time intervals, a timing interrupt signal is generated. When the interrupt signal is generated, the current component is measured, and a rate of change of current with respect to time is calculated. When the calculated rate of change of current is outside of the predetermined rate of change limits, power is discontinued (dI/dt Fault) or reduced (dI/dt Foldback FB) to the high voltage generator.

In a third manifestation, the invention is a power source for an electrostatic sprayer used to electrostatically spray a coating onto a substrate, wherein the coating is attracted to substrate by strong electrostatic forces to produce an improved coating with reduced over-spray. The power source protects from undesirable electrical arcing and electrical faults. A high electrostatic voltage output is generated by a voltage multiplier that converts a low voltage into high electrostatic voltage. The low voltage is derived from a low-voltage variable power supply that includes a control input. A fault relay is included for alternatively connecting and disconnecting the low voltage from voltage multiplier. A Current sensor provides a signal representing an amount of current flowing through the high electrostatic voltage output, and a voltage sensor provides a signal representing a magnitude of the Low voltage. Acceptable values for current signal and voltage signal are also established. A microprocessor subsystem includes hardware and software algorithms for providing a control signal to the Low-voltage variable power supply control input responsive to deviations of current signal and voltage signal from established values, and is isolated from the high electrostatic voltage output and low voltage variable power supply. As a result, the microprocessor subsystem is able to safely control the Low voltage variable power supply when the low voltage power supply is destructively energized.

OBJECTS OF THE INVENTION

A first object of the invention is to provide a microprocessor controlled apparatus and method for controlling a high-tension power supply. A second object of the invention is to ensure that the high-tension power supply is highly resistant to arcing. Another object of the invention is to allow an operator to control or set limits within the power supply to enable the power supply to be used with very diverse materials and, where required, in very diverse environments. A further object of the invention is to eliminate start-up faults that would otherwise be damaging to the power supply, operator, or other objects or persons. Yet a further object of the invention is to protect the equipment and operator against accidental or inadvertent short circuits. These and other objects of the invention are achieved in the preferred embodiment, which offers significant advantage over prior art systems.

DESCRIPTION OF THE PREFERRED EMBODIMENT

Figure 1:
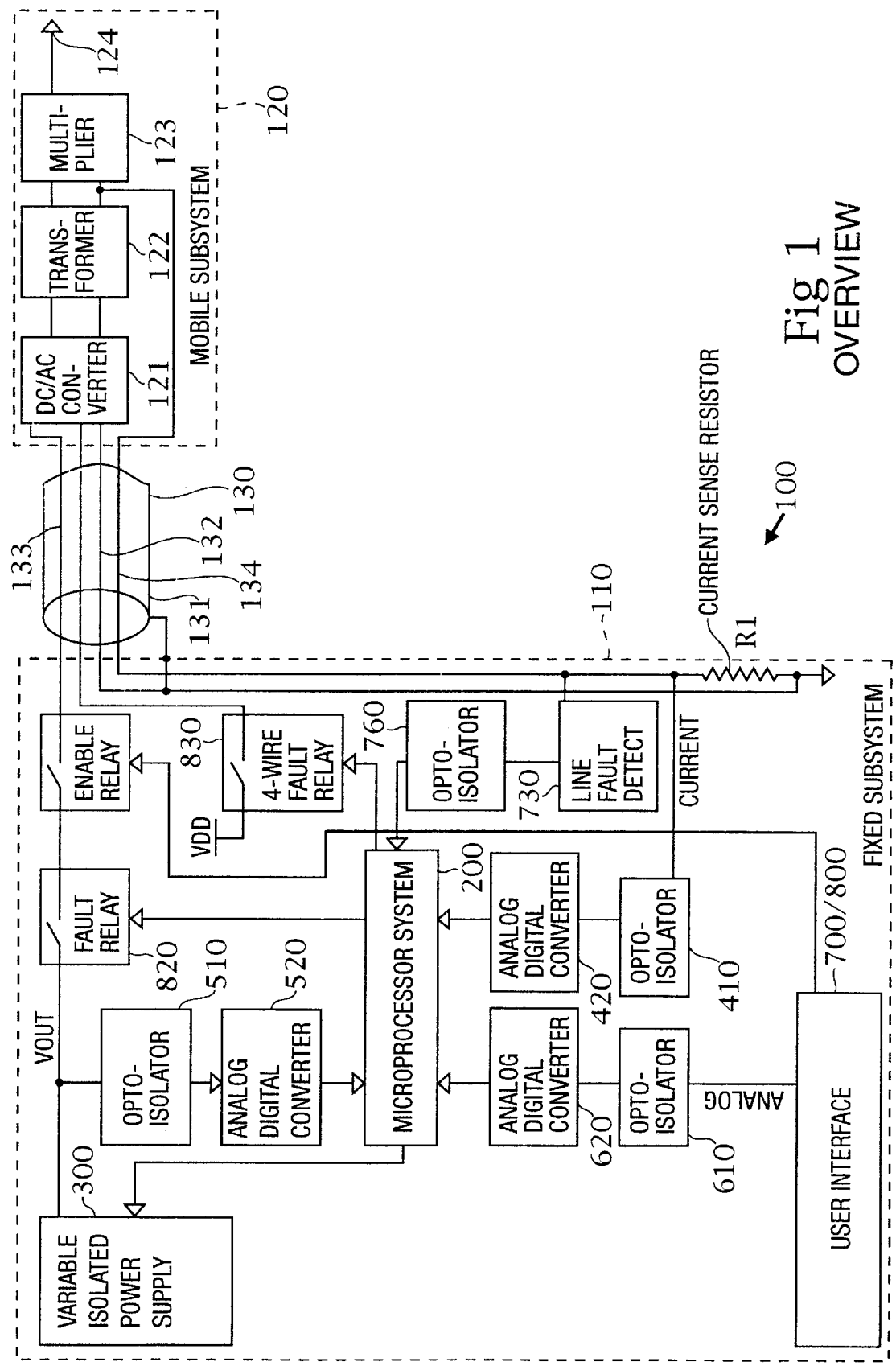
FIG. 1 illustrates an overview of the preferred embodiment electrostatic sprayer system that has been designed in accord with the present invention, by block diagram.

FIG. 1 provides an overview of the preferred embodiment apparatus 100 of the invention, which is an electrostatic sprayer for atomized liquids and fine particles such as paint and the like.

The preferred embodiment apparatus 100 provides a division of functions between a fixed subsystem 110 and a mobile subsystem 120. Primarily for safety and cost, mobile subsystem 120 is equipped with the necessary electrical components to convert low voltage supplied over four-wire harness 130 into a much higher voltage. This may be accomplished with a diode and capacitor cascade known in the electrical arts as a voltage multiplier, and may further include such components as a step-up transformer and alternator. In the preferred embodiment, mobile subsystem 120 includes an inverter 121 for converting a relatively small and harmless DC voltage, typically measured in the tens of volts, carried over four-wire harness 130 into an alternating current. The alternating current is then multiplied many times by transformer 122, and again multiplied to an even greater DC voltage through the rectifier-multiplier 123. Rectifier-multiplier 123 is most preferably comprised by the diode and capacitor cascade. Output 124 is after transformation by inverter 121, transformer 122 and rectifier-multiplier 123, at a much higher DC voltage typically measured in the tens of kilovolts.

Most preferably, the total weight of mobile subsystem 120 is kept at a reasonable level to avoid operator fatigue and, where appropriate, reduce inertia and force required to control the position and, direction of emanating spray.

Four-wire harness 130 is most preferably kept at a lower voltage potential since harness 130 may be exposed to accidents that might break or damage the electrical conductors and insulators, and the adverse effects of such accidents are mitigated by lower operating voltages. In addition, lower event of a damaging accident, braid 131 will most frequently short other internal conductors, rather than allow the internal conductors to become exposed and present direct shock hazards. In addition, braid 131 provides shielding against electromagnetic interference. Internal conductor 132 is provided to carry the ground connection through a low resistance in reliable manner, and conductor 133 is provided to carry the primary voltage potential with respect to ground. Another conductor 134 provides the high voltage mobile subsystem ground connection. Alternatives are contemplated herein for four-wire harness 130 and mobile subsystem 120 without deviating or significantly altering the present invention. For example, power supplied over harness 130 may already be a low voltage alternating current, in which case inverter 121 will not need to be provided within mobile subsystem 120. Other similar variations as are known in the field of electrical voltage or power transmission are contemplated herein.

Within fixed subsystem 110 a user interface 700/800 is provided. Through interface 700/800 the user may establish and provide a variety of operational controls and limits. A number of methods for this interface are contemplated and disclosed hereinbelow, including panel buttons, remote data exchanges using interfaces designed for particular protocols such as the standard asynchronous RS-232, RS-422 and Ethernet protocols network exchanges and other methods. The user, through one method or another, is able to set critical safety limits for apparatus 100, and further provide various desired working parameters such as power supply intensity, and fault level. Various important status and informational displays may also be provided to the user through user interface 700/800.

Operational controls and limits, once input through user interface 700/800, are provided to microprocessor system 200 for processing and comparison with information sensed from other parts of fixed subsystem 110, and, based upon the results of the comparisons, particular events are initiated, such as enabling and controlling DC/DC variable power supply 300, fault relay 820, and 4-wire line fault relay 830. Voltage output from variable power supply 330 is sensed by voltage opto-isolator 510 and converted into a digital voltage representation by analog-to-digital converter 520, and then subsequently conveyed back to microprocessor system 200 for comparison with desired values. Similarly, output current is monitored through a voltage sensed at current sense resistor R1, that is optically isolated through opto-isolator 410, and then digitized by analog-to-digital converter 420. Similarly, input from an external controller in the form of voltage or current is monitored by Opto-isolator 610 and digitized by analog-to-digital converter 620 and conveyed to the microprocessor system 200. As can be seen, microprocessor system 200 is filly isolated from voltage noise and static discharges by opto-isolators 520 and 410, 610, relays 820 and 830, and the opto-isolator within variable power supply 330.

Figure 2:
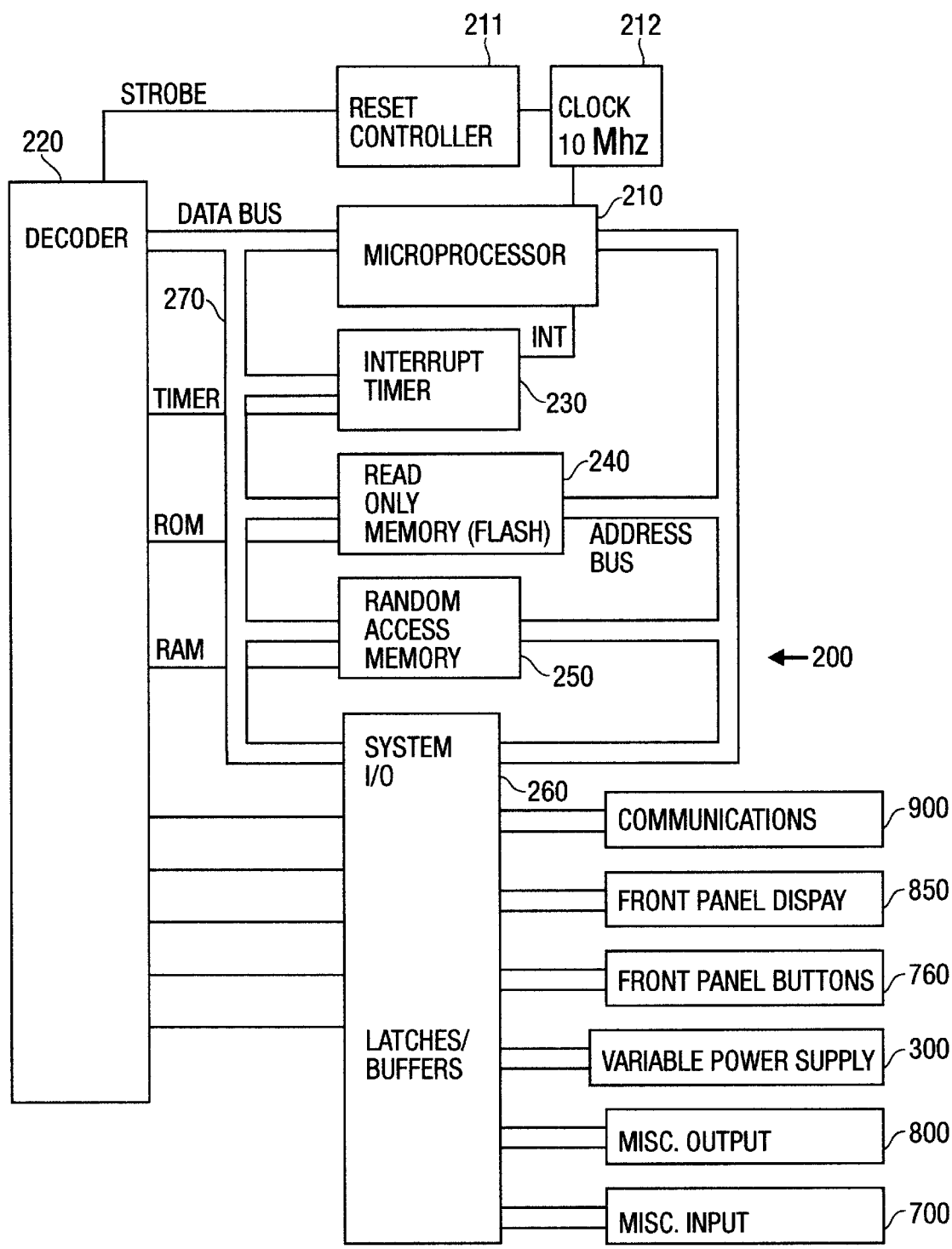
FIG. 2 illustrates the Microprocessor System of FIG. 1 in more detail by block diagram.

FIG. 2 illustrates one preferred embodiment of the microprocessor section of subsystem 110 in much greater detail, though still by block diagram to provide a more general overview. The computational power of subsystem 110 comes primarily from microprocessor system 200. Control is primarily by microprocessor 210 and decoder 220, which send and receive data over the bus. The bus, as illustrated by this block diagram, includes data, address and control lines. Memory 250 and 240 serves as data storage, and will be understood to include any combination of RAM, ROM, PROM, EPROM, EEPROM, NVRAM, flash memory or other memory type as appropriate and desirable for the particular circuit design. Most preferably, some combination of RAM 250 and ROM 240 or NVRAM will suffice. Program code may be stored in the non-volatile RAM (NVR) or ROM (Flash) memory, while active storage requirements of program execution occur in the RAM segment. Interrupt timer 230 serves as a polling interrupt driver to microprocessor 210. The timer is set to a fixed schedule to provide a repetitive interrupt signal. Reset 211 includes a power up and a manual reset which might, for example, be provided at the user interface 260, and also most preferably includes a watchdog circuit which initiates a system-wide reset in the event the microprocessor system 200 otherwise locks up. The microprocessor 210 is clocked at a constant rate provided by clock 212, which could be any frequency needed to provide the computational power that is needed. System I/O 260 provides the interface from the microprocessor 210 with all the external systems, communications 900, front panel display 850, front panel buttons 760, variable power supply 300, miscellaneous inputs 700 and outputs 800. These are described in more detail hereinbelow.

Figure 3:
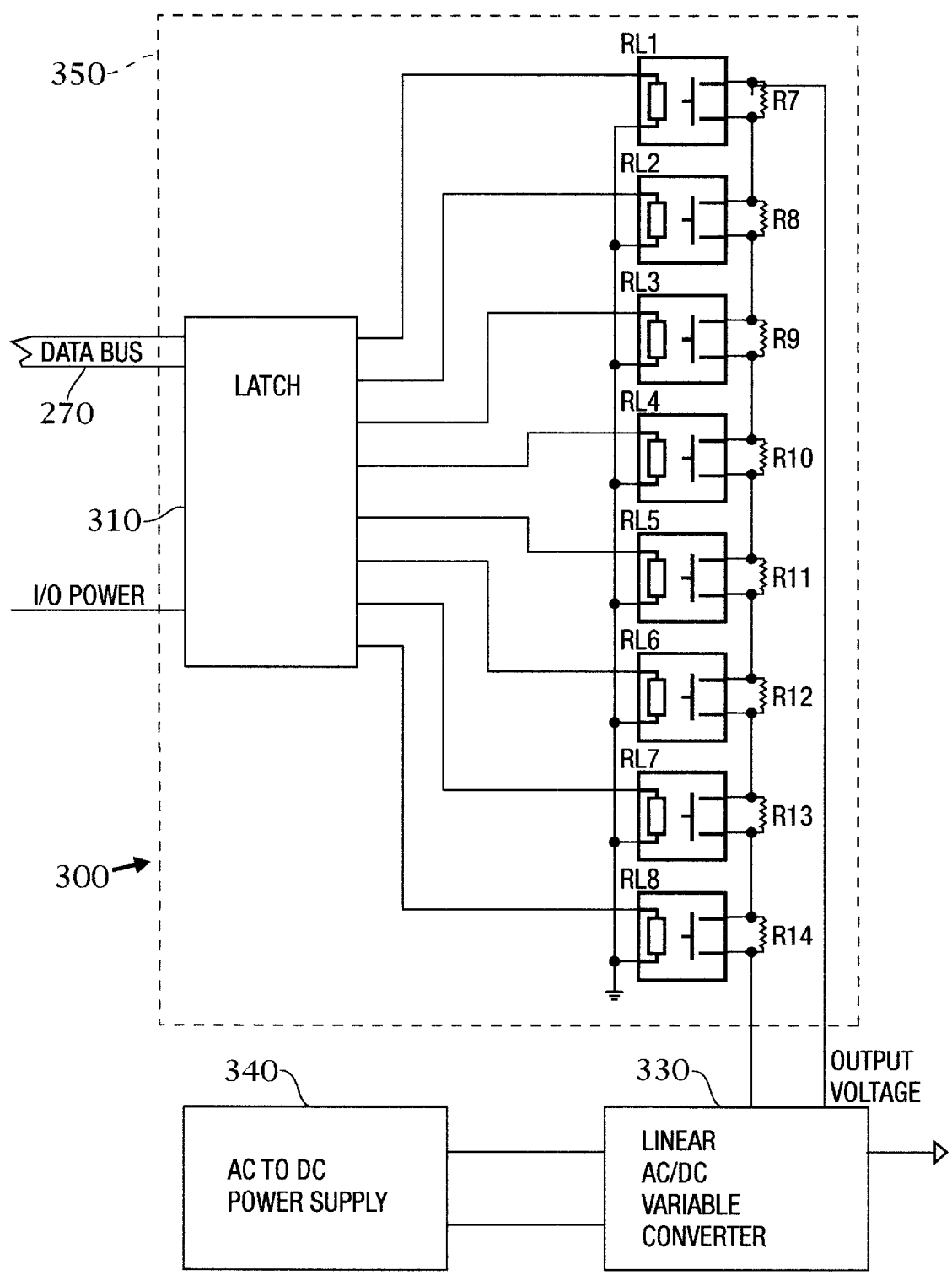
FIG. 3 illustrates a preferred microprocessor system interface to the Linear DC/DC Variable Power Converter in accord with the present invention by block/schematic diagram.

FIG. 3 illustrates one preferred embodiment of the variable power supply control that supplies power over harness 130 to the mobile subsystem 120. Desired voltage levels supplied over harness 130 are implemented within variable power supply 330 through latch 310 which receives a digital words from decoder 220 and microprocessor 210 over the bus system to supply control circuit 350, and a special control signal directly from decoder 220. Variable power supply 330 includes a lockout process in decoder 220, which is responsive to data on the bus and a control signal from within the decoder 330 to provide the digital word, which is a digital indication of desired power supply voltage. The desired voltage is then converted from a digital word into an analog control voltage by digital potentiometer 350. Eight resistors R7–R14 are arranged in a ladder and have values that are approximately twice that of the adjacent resistors, and which increase from R7 to R14. Opto-isolator relays RL1–RL8 of those discrete relays effectively short circuit an adjacent one of resistors R7–R14, such that the resistance of the network provides an analog representation of the digital word. In other words, the combination of R7–R14 and relays RL1–RL8 form an optically isolated digital to analog converter.

Potentiometer 350 may be activated in response to intended voltages and/or current levels. The analog control voltage is then used to control voltage controller 330 through a range of approximately zero to twenty-two volts.

Figure 4:
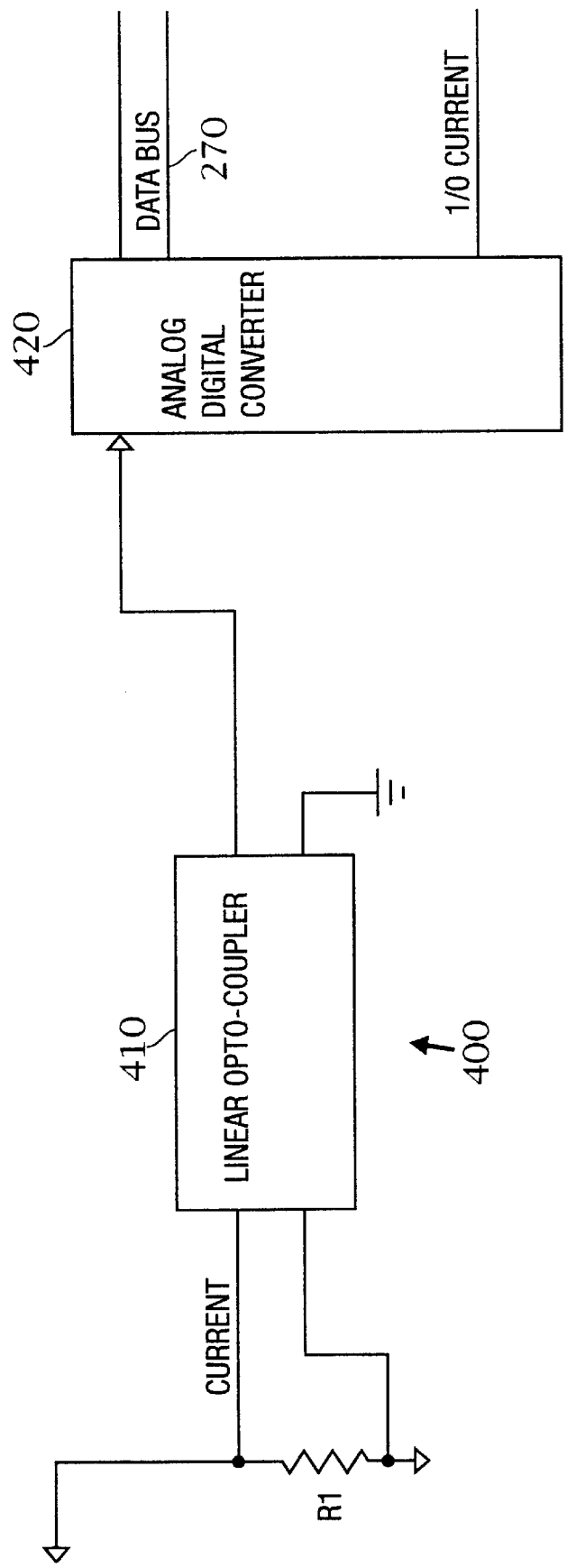
FIG. 4 illustrates a preferred Analog to Digital Interface for the current measuring system in accord with the present invention by block diagram.

FIG. 4 illustrates one preferred embodiment of the current feedback monitoring system, this is in block diagram form for general overview. A voltage representing mobile subsystem 120 current use is derived across resistor R1. This voltage is sent to linear opto-coupler 410 for isolation and digitized by Analog Digital Converter 420. The digital word representing mobile subsystem 120 current use is then picked up by the processor on a regular schedule for processing.

Figure 5:
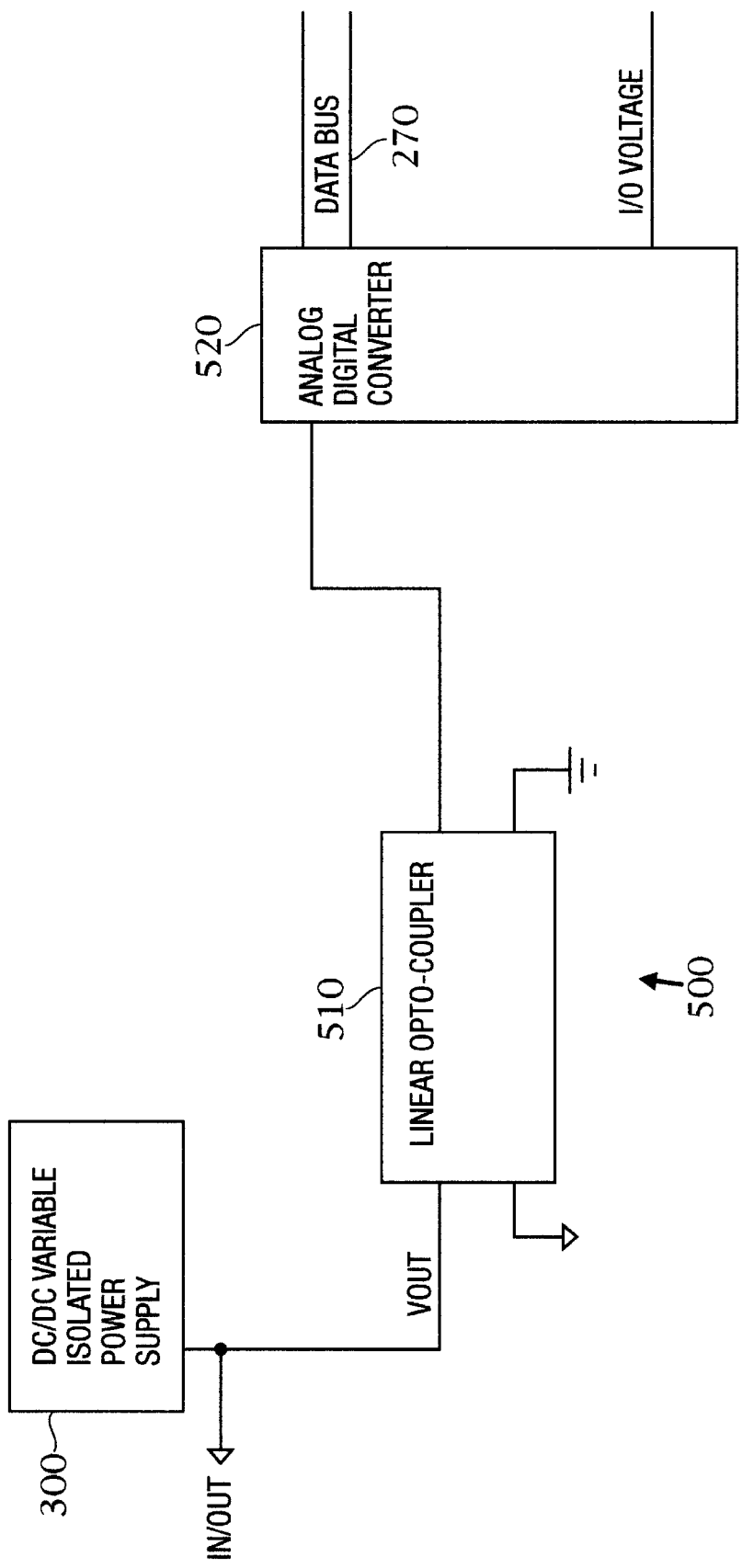
FIG. 5 illustrates the preferred Analog to Digital Interface for the voltage measuring system in accord with the present invention by block diagram.

FIG. 5 illustrates one preferred embodiment of the voltage monitoring subsystem. The voltage from DC/DC Variable Isolated Power Supply 300 is sent to linear opto-coupler 510 for isolation and digitized by Analog Digital Converter 520. The digital value representing mobile subsystem 120 input voltage input is then available to the microprocessor.

Figure 6:
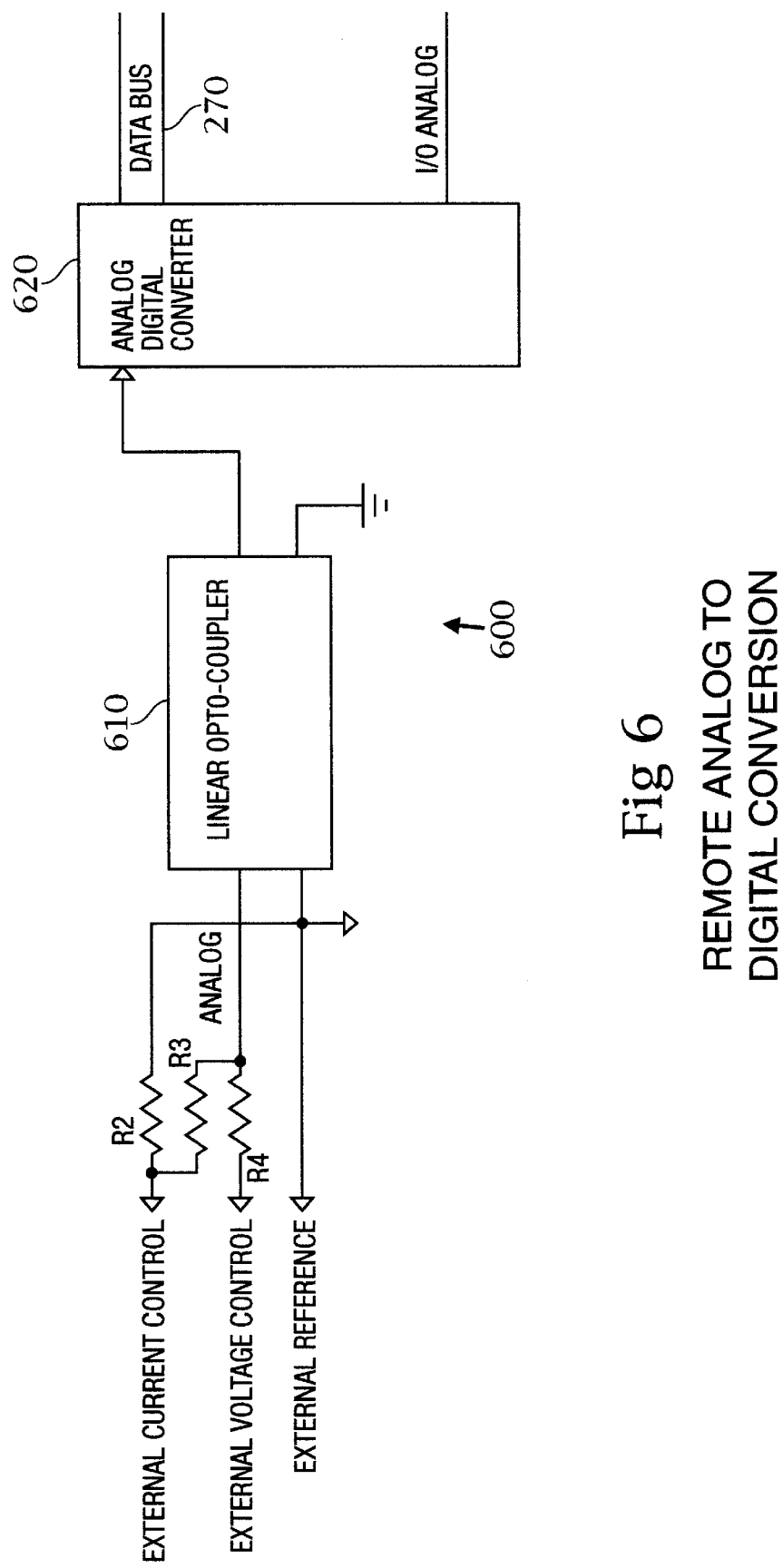
FIG. 6 illustrates the preferred Analog to Digital Interface for the external controller control system in accord with the present invention by block diagram.

FIG. 6 illustrates one preferred embodiment of the external current or voltage control input. This is an external signal usually from an external system that sends a voltage or current representation of the desired power supply voltage. This is used by microprocessor system 200 to determine the correct setting of DC/DC variable power supply 300. This is in block diagram form for general overview. A voltage reference is generated through R2, R3, and R4 to provide a input to linear opto-coupler 610 and digitized by Analog Digital Converter 620. The digital value representing the input current or voltage from the controller is then available to the microprocessor.

Figure 7:
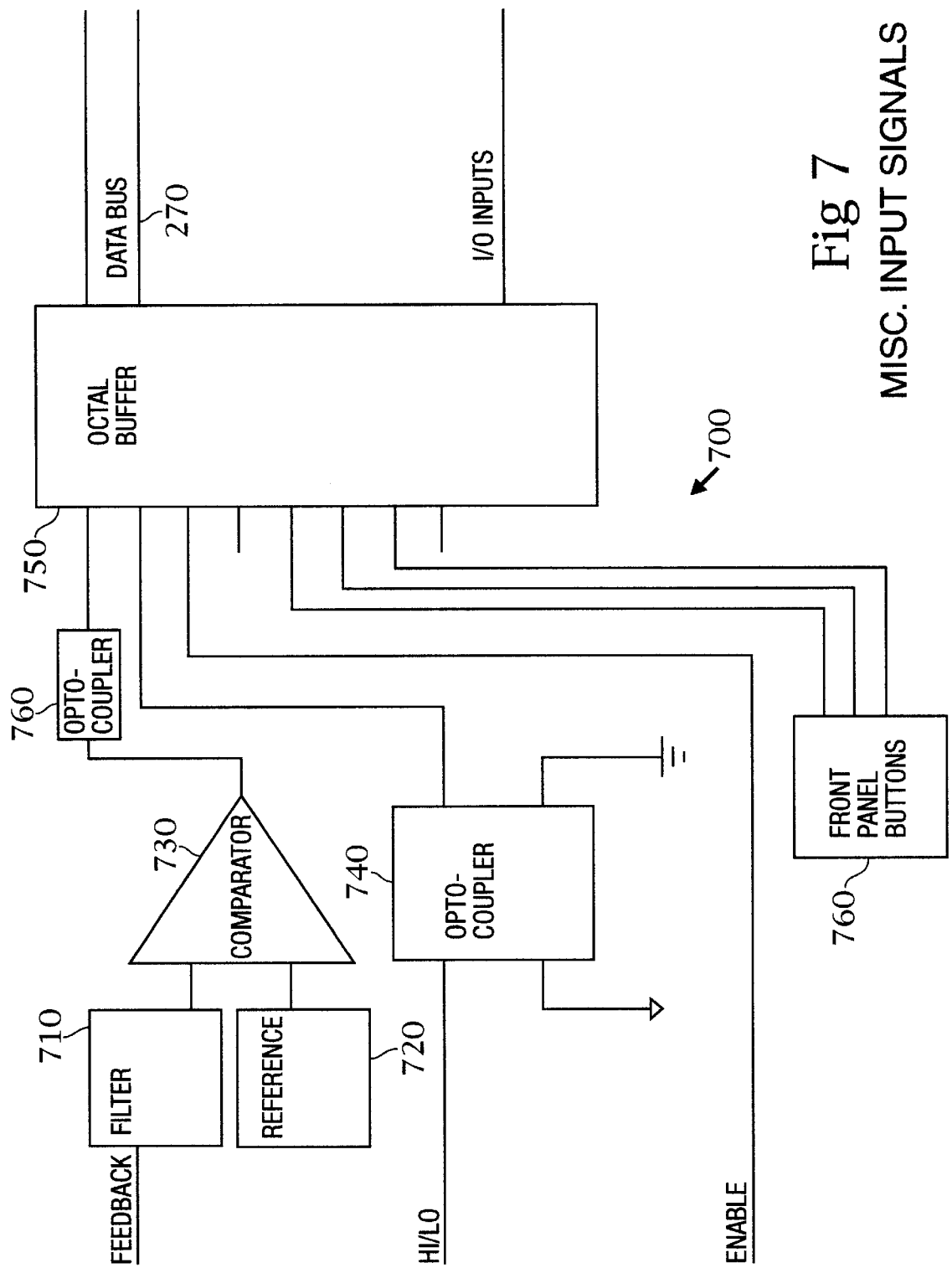
FIG. 7 illustrates various input signals and conversion to a digital word in accord with the present invention by block diagram.

FIG. 7 illustrates one preferred embodiment of many of the miscellaneous input signals. The feedback line 134 contains an AC component that indicates that the DC/AC Converter 121 is operating, thus indicating that all the lines are properly connected to the mobile subsystem 120. This AC signal is filtered from the feedback line 134 and placed into comparator 730 where it is compared to a set reference 720. If the signal is less than the reference then a signal is sent to opto-coupler 760 and to octal buffer 750 where it is read by microprocessor system 200 at a scheduled time. Similarly the external HI/LO signal is sent through opto-coupler 740 and into buffer 750 where it is read by microprocessor system 200 at a scheduled time. Other signals, such as "Enable", "Front panel buttons", etc. are also read in a similar fashion through octal buffer 750.

Figure 8:
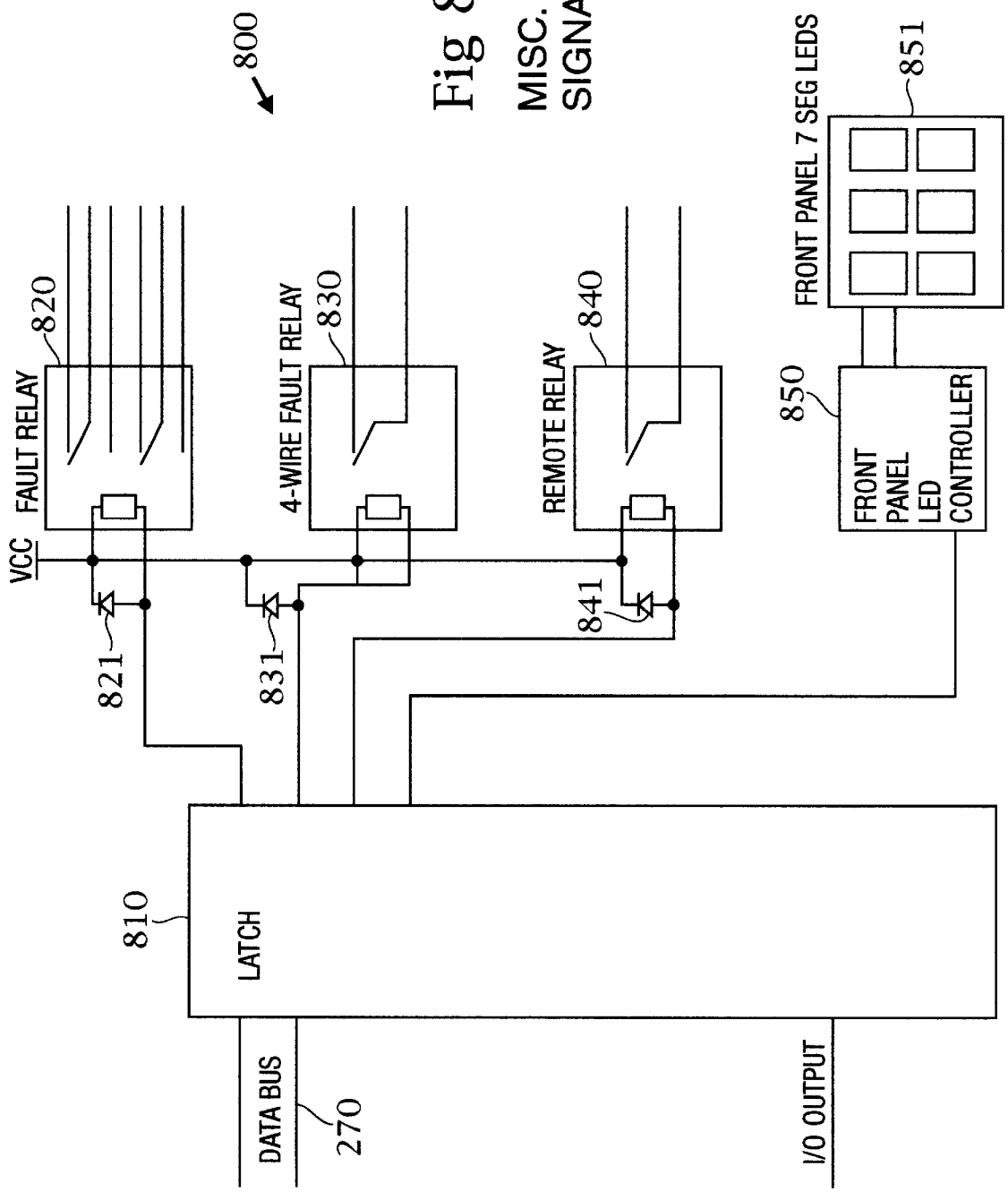
FIG. 8 illustrates various output signals and conversion from a digital word in accord with the present invention by block diagram.

FIG. 8 illustrates one preferred embodiment of many of the miscellaneous output signals. The Fault Relay 820, 4-wire Fault Relay 830, and Remote Relay 840 are connected to latch 810. The latch is directly written to by microprocessor system 200 with a digital word. This directly relates to the control of each of the attached relays. The latch also is connected to front panel LED controller 850 where the digital word is displayed on front panel. Furthermore, instructions identifying a fault 851. Other signals may be attached to latch 810 for direct output control of various signals.

Figure 9:
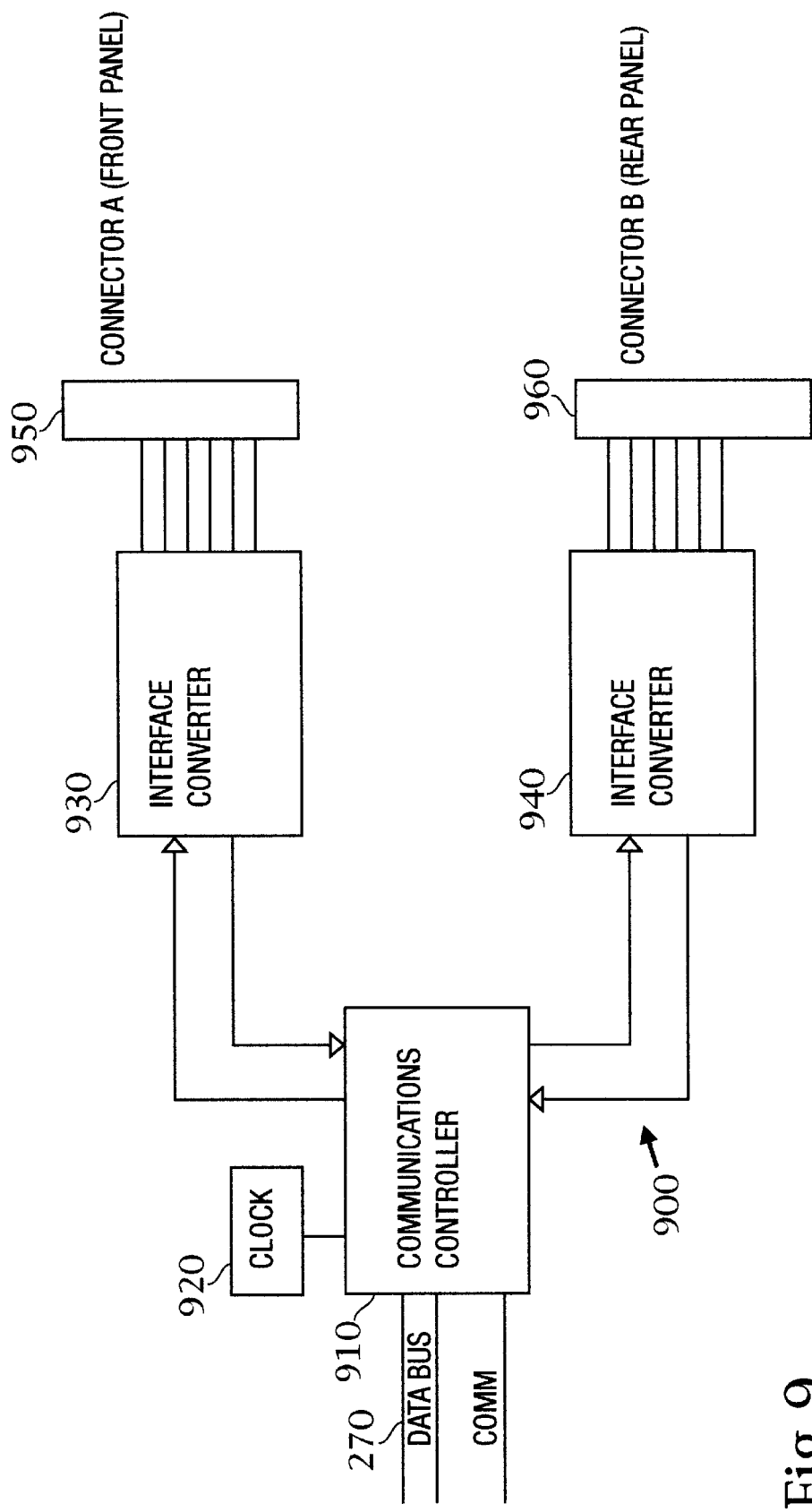
FIG. 9 illustrates the preferred communication interface from the microprocessor system to the user interface in accord with the present invention by block diagram.

FIG. 9 illustrates one preferred embodiment of the communications interface. This again is shown in block format for overall understanding. Communications Controller 910 could be one of many types including UART, USART, or Ethernet Controller. These are the devices that provide the timing interface standards and connect directly to the Data Bus 270 and decoder 220. The serial communications lines connect to interface converters 930 and 940. In this particular design, an RS232 interface converter 930 connects to connector 950 which is a DB-9-S connector and interface converter 940 which may be RS422 or Ethernet connects to back panel connector 960.

FIGS. 10–14 illustrate by flow chart a set of steps that demonstrate an algorithm for implementing the preferred features of the present invention. Those skilled in the art will recognize at once that these flow charts are vastly simplified in order to focus on the features of the present invention and to teach those skilled in the art that which is required for application of the invention, as required by the patent statutes, and that there will be many more activities required for a fall system implementation. Furthermore, there may be differences across various hardware and software platforms, differences that will nevertheless be understood by those who would practice the present invention.

Figure 10:
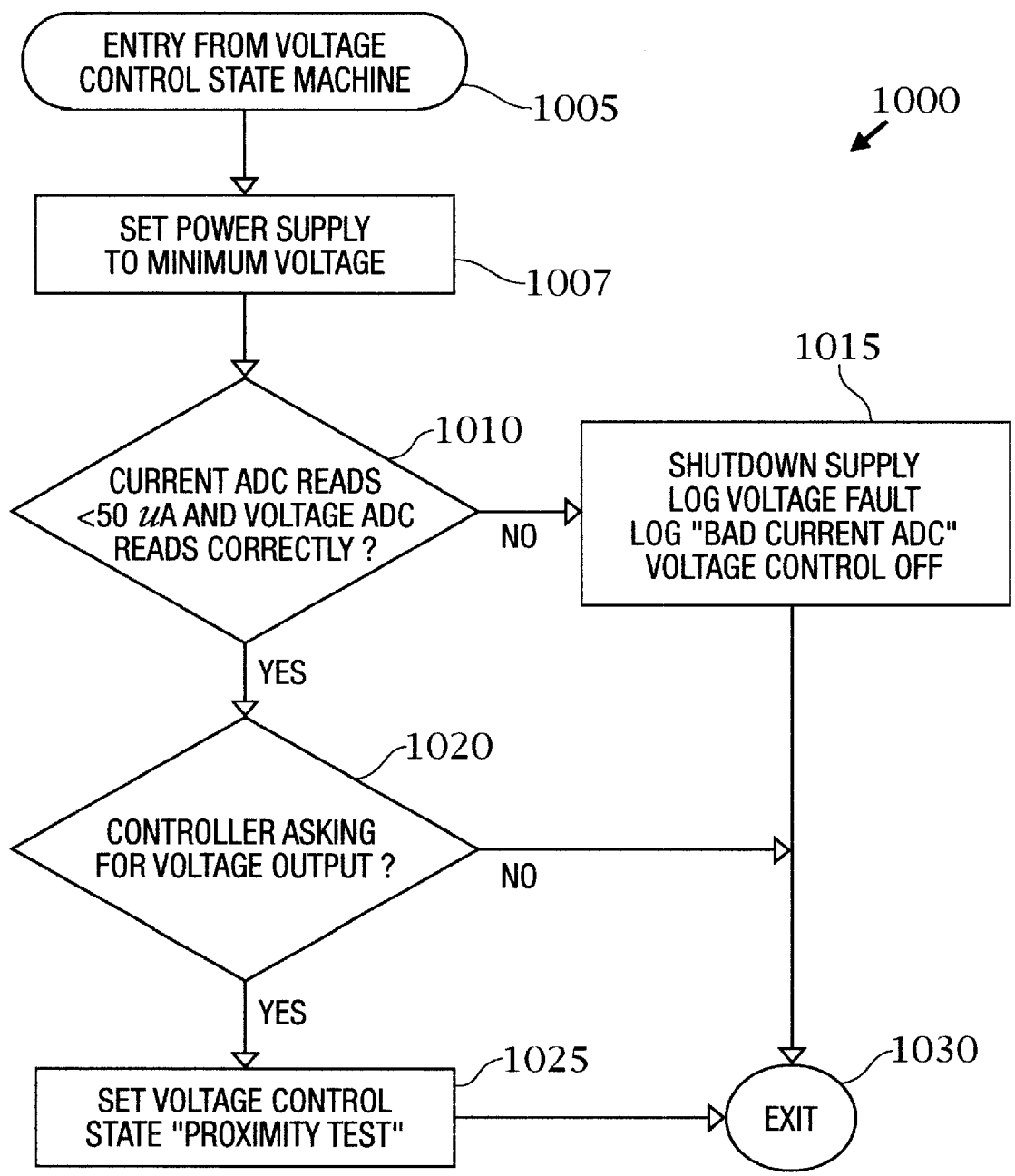
FIG. 10 illustrates by flow chart a preferred method for testing voltage control of a power supply used to supply power to an electrostatic device.
Figure 11:
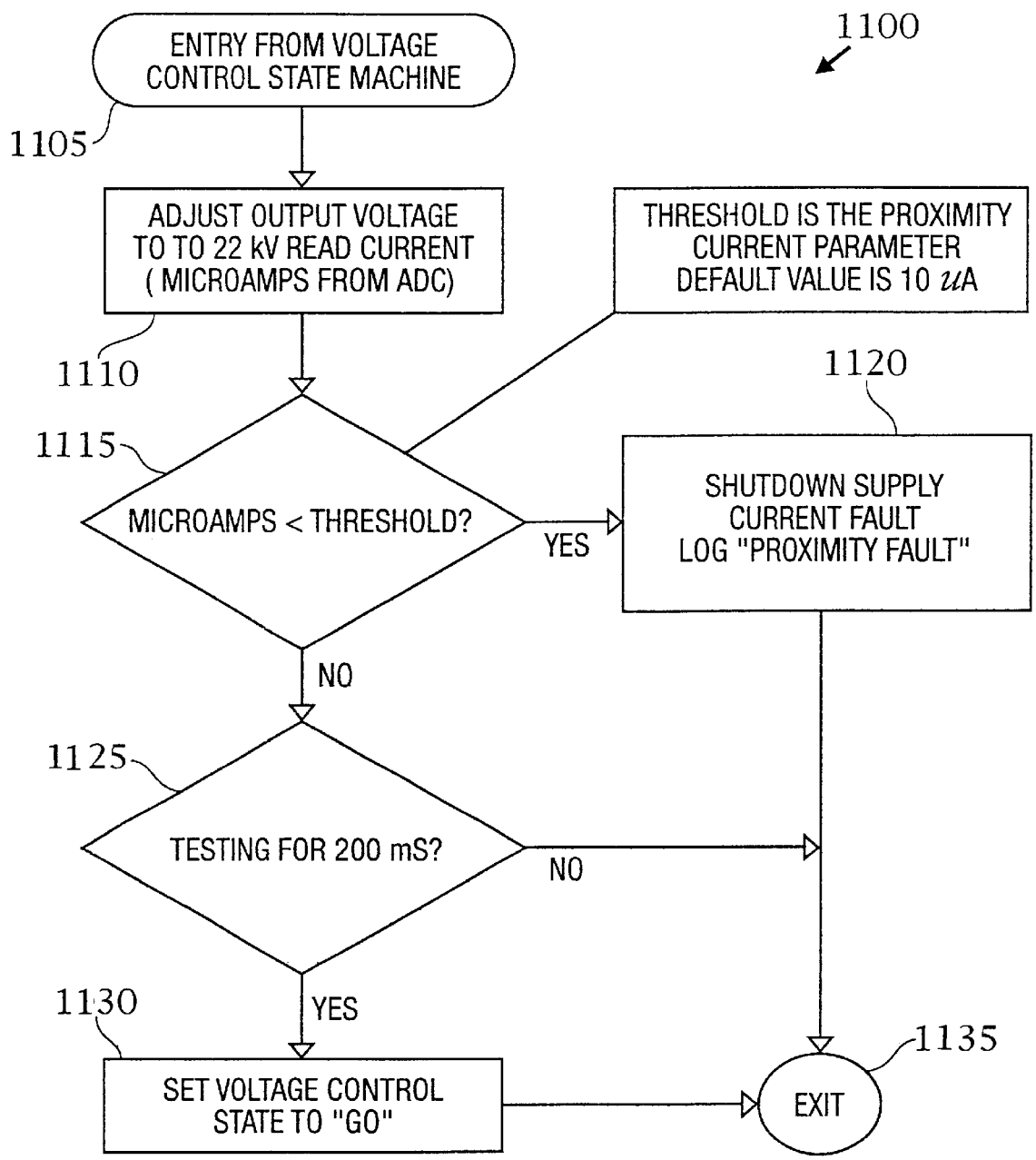
FIG. 11 illustrates by flow chart a preferred method for performing an electrostatic device proximity test in accord with the invention.
Figure 13A:
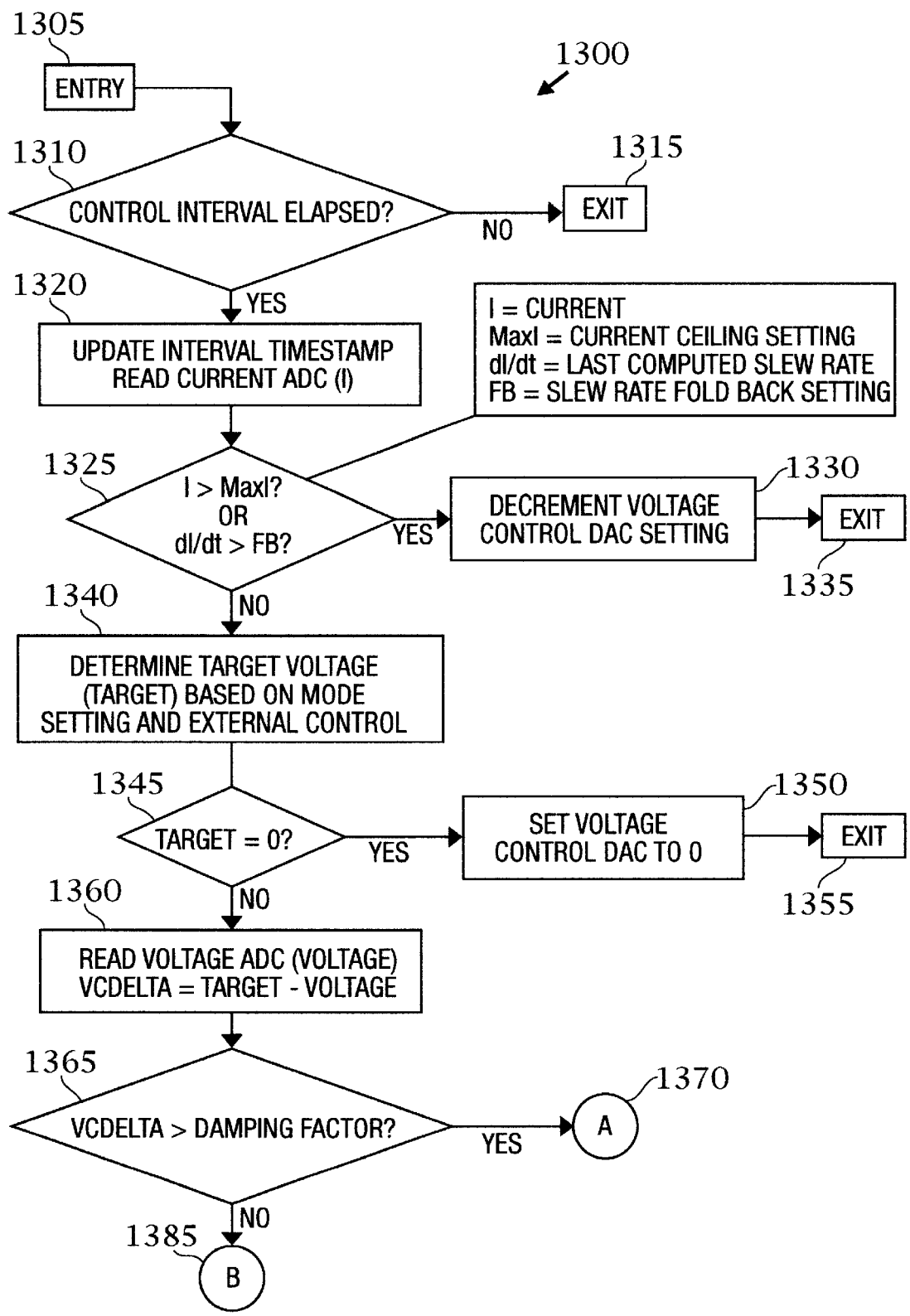
FIGS. 13a, 13b and 13c illustrate by flow chart a preferred method for controlling voltage at the electrostatic device, in accord with the preferred method of the invention.
Figure 14:
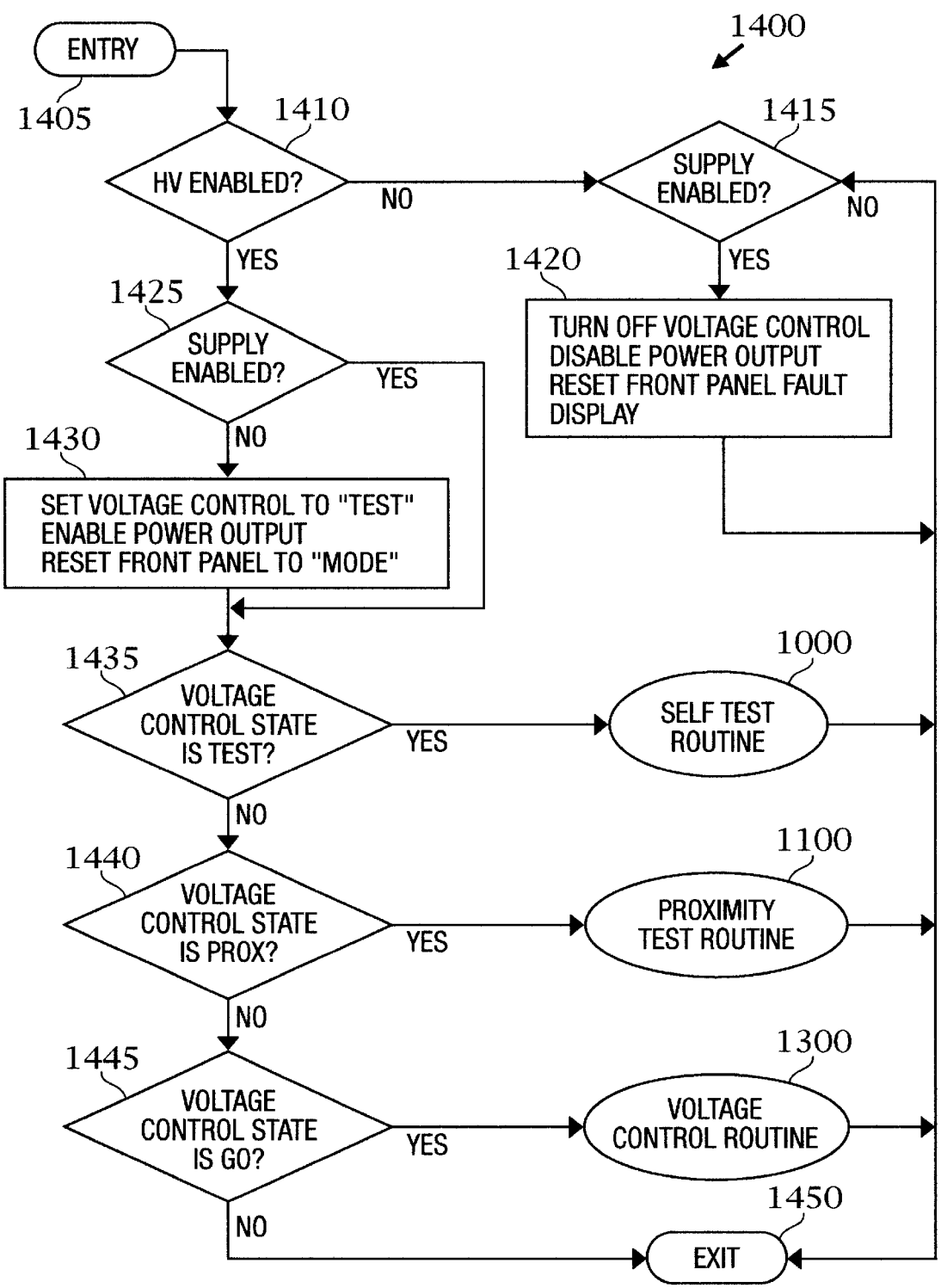
FIG. 14 illustrates by flow chart a preferred method for a voltage control state machine in accord with the invention.

FIG. 14 illustrates the top-level algorithm employed by the microprocessor to control the voltage sent to the mobile subsystem (FIG. 1, 120) and ultimately to the electrostatic painting apparatus. This routine, called the Voltage Control State Machine, is run at frequent intervals. It monitors the state of the high voltage enable signal (FIG. 7, Enable), and runs the appropriate test or voltage control routine based on the state of the voltage control system. When high voltage is enabled, either by the controller or by the front panel HV ENABLE switch, this routine sets the voltage control state to "TEST" and closes the Fault Relay (FIG. 1, 820) to engage voltage output. While in the TEST state, the voltage control state machine runs pre-test routine (FIG. 10). If the pre-test succeeds, the voltage control state is changed to "PROXIMITY TEST". While in this state, the voltage control state machine will run the proximity test routine (FIG. 11). If the proximity test succeeds, the voltage control state is changed to "GO". While in this state, the voltage control state machine runs the voltage control routine (FIG. 13A). The voltage control state machine will remain in this state until high voltage is disabled, either intentionally or as the result of a fault condition.

The design of the test routines, the voltage control routines, and the safety monitoring routines all incorporate features designed to minimize the chance of unwanted arcing.

FIG. 10 illustrates a system pre-test technique that is employed by the microprocessor to validate basic operation of the power supply before attempting to output any voltage. Operation of the supply is unsafe, and is not permitted, unless this verification test passes. This routine is entered from the voltage control state machine (FIG. 14, step 1000) when it is in the "TEST" state. Its purpose is to verify correct operation of the voltage and current A/Ds (FIG. 1, 420 and 520) before using them. In step 1007, the output voltage from variable power supply (FIG. 1, 300) is set to the minimum output level. Fault relay (FIG. 1, 820) has not yet been enabled, so there is no voltage sent to the mobile subsystem (FIG. 1, 120) and therefore no high voltage is generated during this test. At step 1010, the current analog to digital converter (FIG. 1, 420) is polled to see if the measured output current exceeds fifty microamperes. The voltage analog to digital converter (FIG. 1, 520) is also polled to confirm that the target voltage can be sensed. If either the high voltage current is excessive or the voltage reading is inappropriate, the program flow goes to step 1015, where microprocessor system (FIG. 1, 200) will shut down the variable power supply and log the fault. Subroutine 1000 will then exit at step 1030. Otherwise, the fixed subsystem 110 has passed the initial start-up self-test, and will check, at step 1020, to see whether there is a request for output voltage. If not, there is no further action required, and program flow will proceed to exit at step 1030. Otherwise, the state of the voltage control state machine 1400 will be set to "PROXIMITY TEST" at step 1025, and then program flow will exit.

FIG. 11 illustrates the algorithm employed to implement the proximity safety test. The purpose of this test is to avoid arcing in the event that the electrostatic device is positioned too closely to a conductive object during the initial ramping up of the voltage. This subroutine is run from the voltage control state machine (FIG. 14, 1100) while in the "PROXIMITY TEST" state. With the output voltage (Vout) set to minimum, the fault relay (FIG. 1, 820) is closed, and power is supplied over the harness (FIG. 1, 130) to the mobile subsystem (FIG. 1, 120). Subsequently, in step 1110, Vout is raised to a level adequate to generate a multiplied voltage in the vicinity of 22 kV at the electrostatic device. Operational voltages for such an electrostatic sprayer will normally be five to ten times higher. At this lower voltage, the risk of destruction or damage is greatly reduced. In step 1115, the output current is then read from the A/D (FIG. 1, 420), and compared to a variable threshold. If the measured current exceeds this threshold, the variable supply (FIG. 1, 300) is turned off, the fault relay (FIG. 1, 820) is opened, and a proximity test failure is logged at step 1120, followed by exiting the subroutine at step 1135. Otherwise, if the current remains below the threshold for 200 milliseconds, the test has succeeded, and the state of the voltage control state machine is set to "GO" before exiting.

Figure 12:
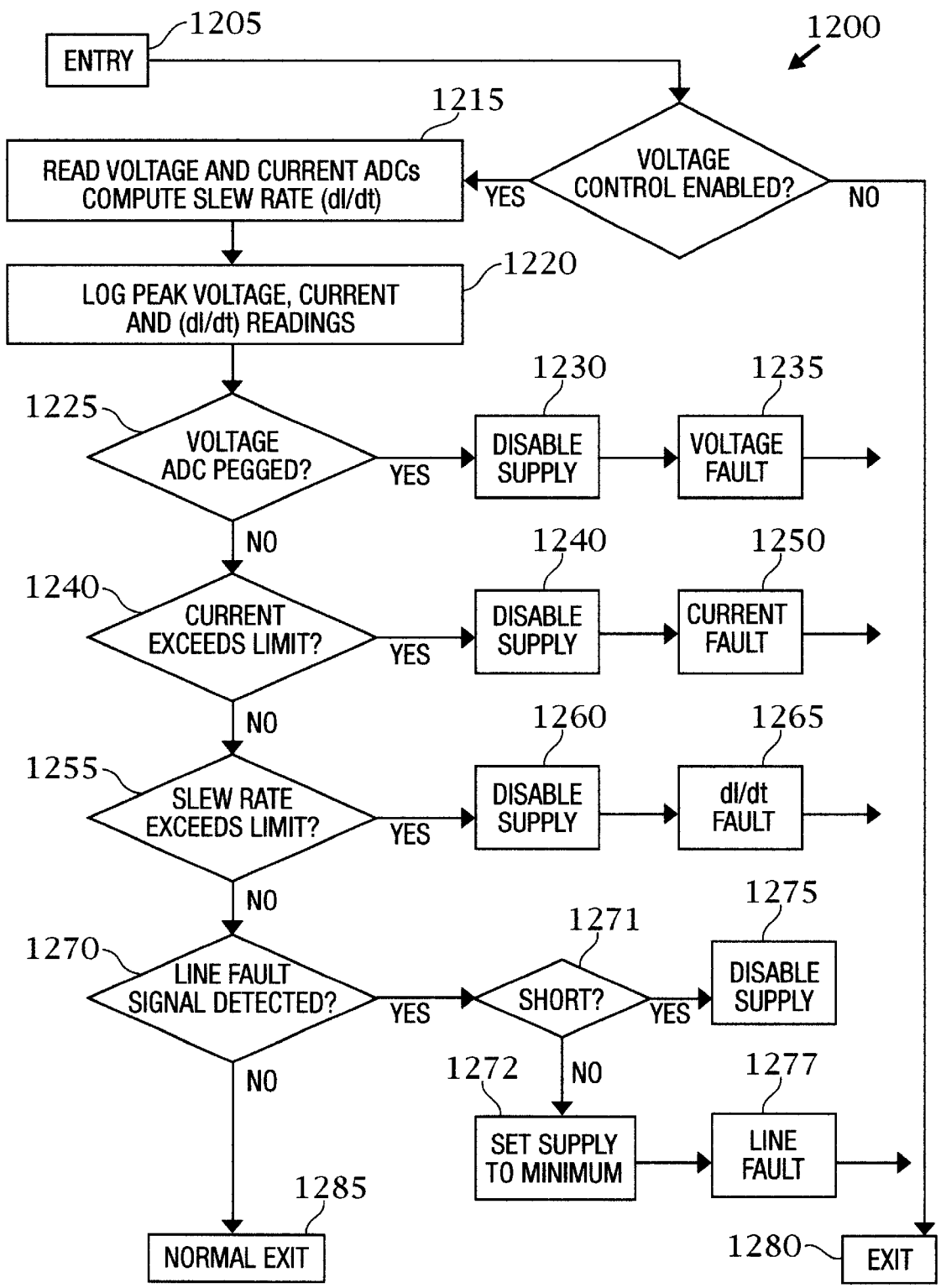
FIG. 12 illustrates by flow chart a preferred method for repetitive testing of the status of the power supply and associated electrostatic device at a predictable interval in accord with the invention.

FIG. 12 illustrates the steps taken by a special routine that performs safety monitoring while the voltage control state machine is in the "GO" state. This routine is separate from the voltage control state machine, and runs at 1 millisecond intervals in hard real-time to guaranty maximum reliability and safety. When high voltage output is enabled, it constantly monitors current, voltage, slew-rate and tests for line open/short conditions. The first operational step 1210 tests whether voltage control is enabled. If not, then this routine is not needed and it directly exits at step 1280. Otherwise, at step 1215, the voltage and current ADCs (FIG. 1, 420 and 520) are sampled, and the current slew rate (dI/dt) is computed. The voltage, current and slew rate are recorded into a real-time log at step 1220. In the event of a fault, this log can later be reviewed to assess the cause of the problem. At step 1225 the voltage reading is tested to see if it reads maximum. If so, in step 1230 variable power supply (FIG. 1, 300) is turned off, the fault relay (FIG. 1, 820) is opened and a voltage fault is be logged in step 1235 before exiting at step 1280. At step 1240, the current reading is compared with a preset limit. If the current is excessive, the power supply is disabled, a current fault is logged in step 1250, and the routine exits at step 1280. In step 1255, the slew rate (dI/dt) is compared with preset limit. If the slew rate exceeds the maximum limit, then in step 1260 the power supply is disabled, a slew rate fault is logged in step 1265, and the routine exits at step 1280. If voltage, current and current slew rate are all within limits, the next safety check at step 1270 determines if a line fault has occurred. If the line fault detector (FIG. 1, 730 and 760) indicates the presence of a line fault, then a second test at step 1271 is made to determine if it is due to an open or short circuit condition. If the fault is a short circuit then in step 1275 the variable power supply (FIG. 1, 300) is turned off and the fault relay (FIG. 1, 820) is opened. If the line fault is due to an open circuit, the microprocessor sets the variable output voltage 0. In either case, a line fault is logged in step 1277, and the routine exits at step 1280. Otherwise, all safety checks were completed successfully, so no faults are logged, and the 1-millisecond safety routine 1200 exits normally at step 1285.

FIG. 13A illustrates the voltage control subroutine. This subroutine is called from the voltage control state machine (FIG. 14, 1300) when in the "GO" state. The purpose of this routine is to smoothly and efficiently adjust the output voltage to the requested level. The voltage control includes monitoring of current rise to proactively avoid situations that might cause an arc. In the preferred embodiment of the electrostatic power supply, the requested voltage level is determined by a number of means. In the case of local mode control, the output voltage is fixed to a constant preset value. In the Hi/Lo mode, the output voltage takes on either of two preset values. In other cases, a variable input voltage or current (FIG. 1, 620) can be used to control the output voltage. The voltage control subroutine is entered from at step 1305. Step 1310 tests to determine how much time has elapsed since this routine was last executed by the microprocessor. If this preset minimum interval has not yet elapsed, then it is not yet time to update the output voltage and this subroutine exits at step 1315. Otherwise, at step 1320 the interval time stamp is updated, and the current ADC (FIG. 1, 420) is sampled. At step 1325, the current reading is compared to a preset threshold (Maxi), and the current slew rate (dI/dt) is compared to a current slew rate fold-back threshold, illustrated here as FB. FB is most preferably a percentage of the slew rate maximum (fault) limit. If either the current exceeds Maxi or the slew rate exceeds FB, then in step 1330, the output voltage is decreased and the subroutine exits at step 1335. If current and slew rate are both within limits, the target voltage is determined at step 1340 based upon the mode setting and external control settings and values. If, at step 1345, the target output voltage is zero, then the output voltage is turned off in step 1350 and the subroutine exits at step 1355. If control reaches step 1360, then a calculation is made to determine the difference between the target and the actual output voltage. The result is summed into a signed variable, VCDELTA. If this sum, VCDELTA has over time become greater than a preset value, DAMPING FACTOR, then the voltage needs to be increased, and control goes to step 1375 in FIG. 13C. Otherwise, processing moves to step 1385 on FIG. 13B. In step 1387, VCDELTA is compared with the negative of the DAMPING FACTOR value. If VCDELTA has over time become less than the negative of the DAMPING FACTOR value, the voltage needs to be decreased. If the VCDELTA does not exceed the DAMPING FACTOR no modification of the voltage is necessary.

Figure 13B:
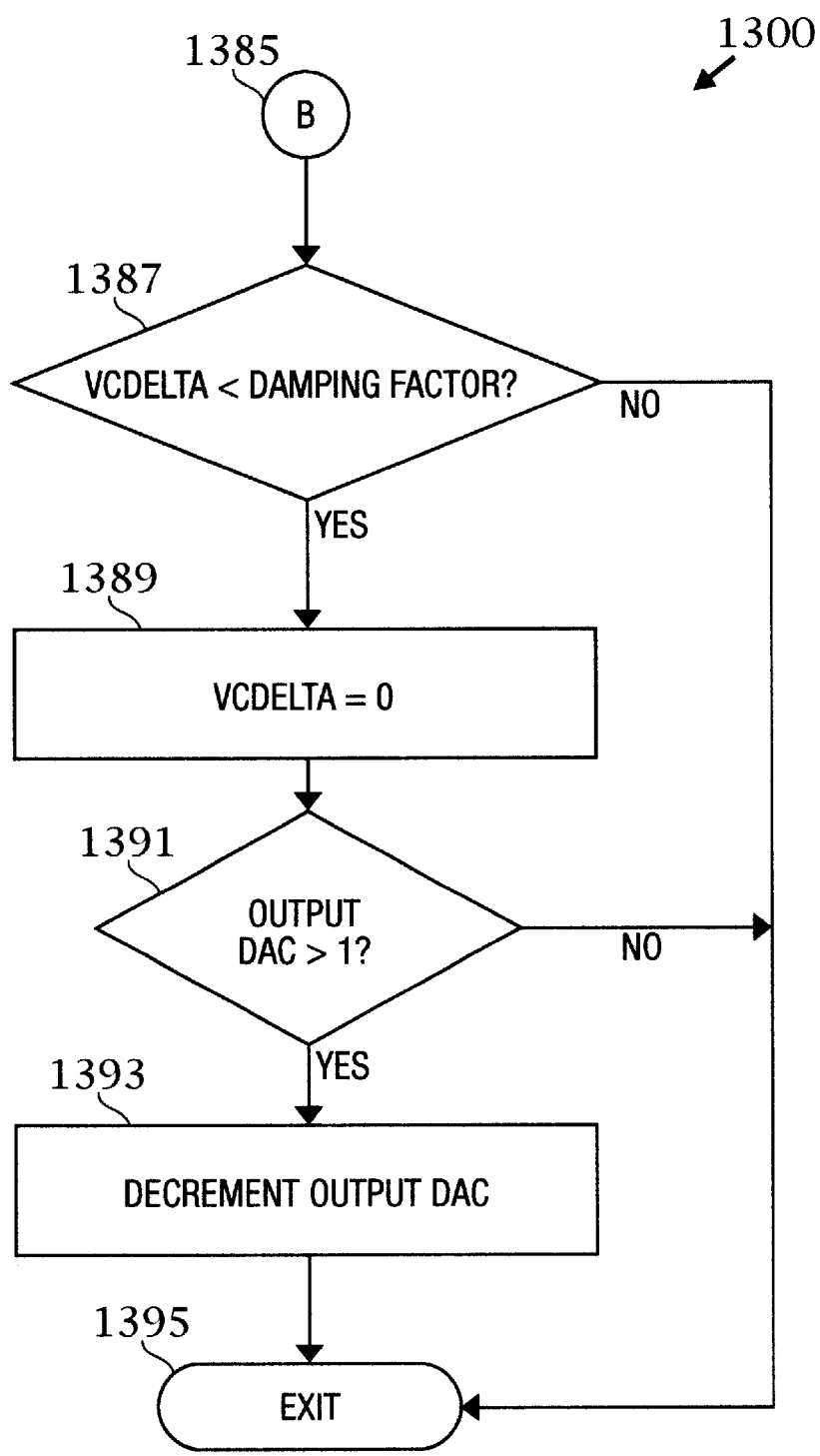

FIG. 13B illustrates the portion of the voltage control subroutine that is run when the actual output voltage may be greater than the desired voltage. In this case, voltage may need to be decreased. In step 1387, the VCDELTA is compared with the negative of the DAMPING FACTOR value. If over time, the VCDELTA has fallen below the DAMPING FACTOR, then it is time to decrease the voltage. Otherwise, the subroutine does not modify the output voltage and exits in step 1395. In step 1389 the VCDELTA sum is reset to 0 to reinitialize the smoothing function. In step 1391, if the output voltage is not already set to the minimum (without being off) the output voltage is decreased. In either case, the subroutine exits at step 1395.

Figure 13C:
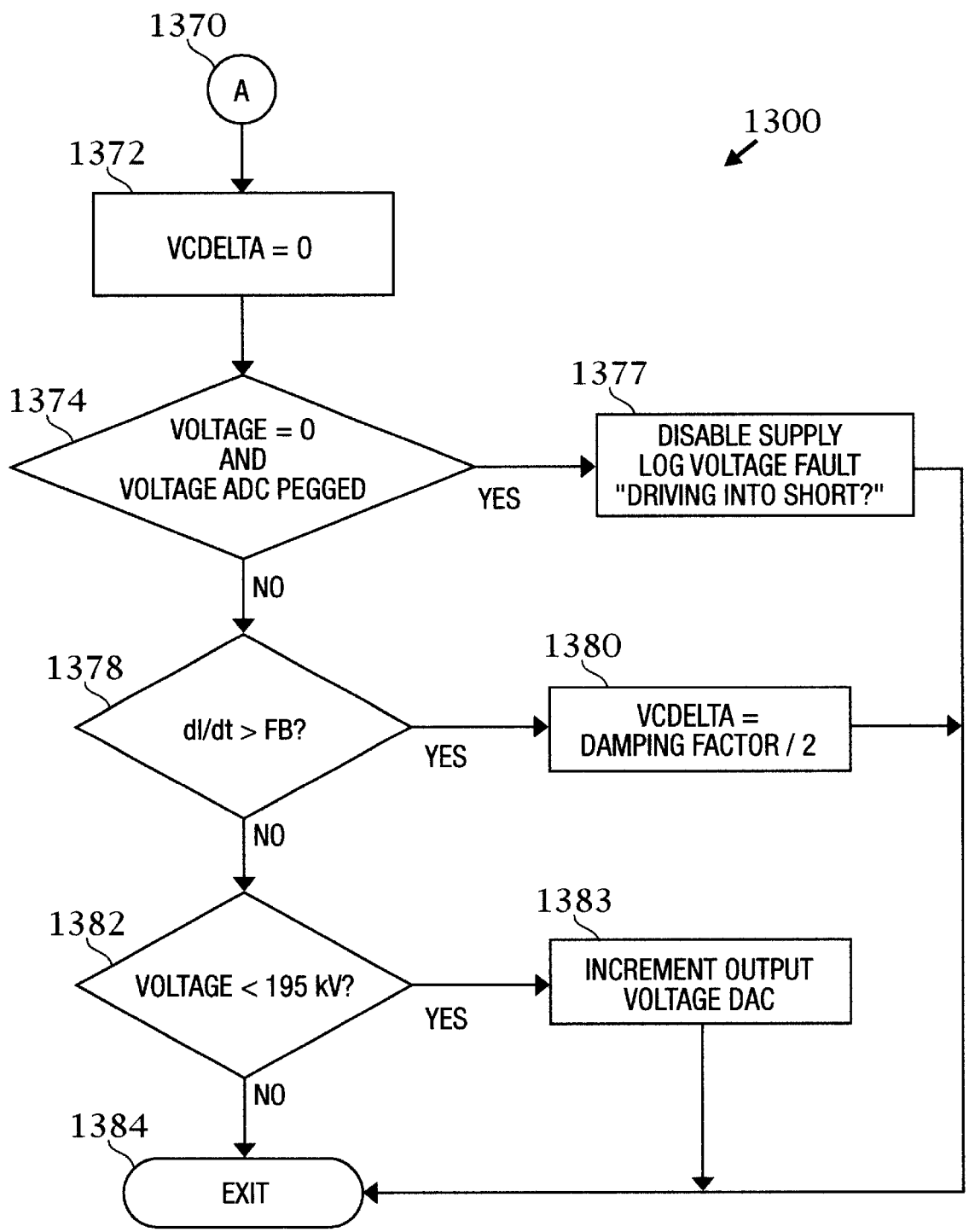

FIG. 13C illustrates the portion of the voltage control subroutine that is run when the actual output voltage is below the target voltage. In step 1372 the VCDELTA sum is reset to 0 so the smoothing algorithm will work properly. If in step 1374 it is found that output voltage is set at maximum, but the voltage ADC (FIG. 1, 520) reads 0, then the power supply is assumed to be driving into a short circuit. In this case, in step 1376 the supply is disabled and the fault condition is logged before exiting in step 1384. Otherwise, in step 1378, the current slew rate (dI/dt) is compared with the slew rate limit threshold (FB). If the slew rate exceeds the threshold, then this routine avoids increasing the voltage, and instead biases VCDELTA toward an increase before exiting the subroutine at step 1384. If the slew rate is good, then in step 1382, the output voltage is tested to see if it is less than the design limit of 195 kV. If so, in step 1383 the output voltage is increased. The subroutine exits at step 1384.

As is now quite evident, voltage control state machine 1400 initiates a self test, followed by a proximity test, followed by subsequent arc prevention and voltage control, the combination which serves to protect hardware, operator and product controlled by the electrostatic process from harm or destruction.

While the foregoing details what is felt to be the preferred embodiment of the invention, no material limitations to the scope of the claimed invention are intended. Furthermore, features and design alternatives that would be obvious to one of ordinary skill in the art are considered to be incorporated herein. Obviously, many modifications may be made without departing from the basic spirit of the present invention. Accordingly, it will be appreciated by those skilled in the art that within the scope of the appended claims, the invention may be practiced other than has been specifically described herein.

We claim:

1. A method for preventing arcs or destructive fault conditions from damaging an electrostatic device, comprising the steps of:

providing power to said electrostatic device for high voltage applications, including a current component of said high voltage;

establishing predetermined limits for a rate of change of said current component;

generating a timing interrupt signal at a predetermined time interval;

measuring said current component responsive to said timing interrupt signal;

calculating a rate of change of said current with respect to time and determining whether said calculated rate of change of current is outside of said predetermined rate of change limits; and reducing and still providing said power to said electrostatic device if said calculated rate of change of current is outside of said predetermined limits.

2. The method for preventing arcs or destructive fault conditions of claim 1 further comprising the additional steps of:

establishing predetermined limits for a voltage component of said power and for a current component of said power;

measuring a voltage delivered to said electrostatic device responsive to said timing interrupt signal and producing a signal indicating a magnitude of said voltage;

determining whether said signal indicating voltage magnitude is outside of said predetermined voltage limits;

determining whether said signal indicating current magnitude is outside of said predetermined current limits; and discontinuing providing said power to said electrostatic device if said voltage magnitude is outside of said predetermined limits or if said current magnitude is outside of said predetermined limits.

3. The method for preventing arcs or destructive fault conditions of claim 2 further comprising the additional steps of:

storing a count representative of a target magnitude for said voltage component; and incrementing said count to initiate an increase in magnitude of said voltage component, and decrementing said count to initiate a decrease in magnitude of said voltage component.

4. The method for preventing arcs or destructive fault conditions of claim 3 further comprising the additional steps of:

setting fold-back ceilings for current and current slew rate;

comparing said signal indicating current magnitude to said current ceiling setting and also comparing said calculated rate of change of current to said current slew rate ceiling setting; and decrementing said count responsive to said comparing step if either said signal indicating current magnitude exceeds said current ceiling or said calculated rate of change of current exceeds said current slew rate ceiling.

5. The method for preventing arcs or destructive fault conditions of claim 3 further comprising the additional steps of:

subtracting said signal indicating a magnitude of said voltage from said target magnitude for said voltage component to produce a voltage difference;

evaluating whether said voltage difference is greater than a damping factor of said electrostatic device or less than a negative of said damping factor; and incrementing or decrementing said count responsive to said evaluating step.

6. The method for preventing arcs or destructive fault conditions of claim 1, further comprising the additional steps of:

providing voltage of a magnitude less than necessary for operation to said electrostatic device upon starting said device;

measuring said current component; and discontinuing said providing of power to said electrostatic device if said current component exceeds a proximity threshold.

7. The method for preventing arcs or destructive fault conditions of claim 1, further comprising the additional steps of:

disconnecting a variable voltage power supply output from said electrostatic device;

applying diverse control inputs to said variable voltage power supply;

measuring a voltage output from said variable voltage power supply responsive to said diverse control inputs; and preventing said providing of power to said electrostatic device if said variable voltage power supply voltage output is inappropriate responsive to said diverse control inputs.

8. A power source for an electrostatic sprayer used to electrostatically spray a coating onto a substrate wherein said coating is attracted to said substrate by strong electrostatic forces and which produces an improved coating with reduced over-spray and which is further protected from undesirable electrical arcing and electrical faults, comprising:

a high electrostatic voltage output;

a voltage multiplier for converting a low voltage into said high electrostatic voltage output;

a low-voltage variable power supply which provides a low voltage to said voltage multiplier and which includes a control input;

a fault relay for alternatively connecting and disconnecting said low voltage from said voltage multiplier;

a current sensor providing a signal representing an amount of current flowing through said high electrostatic voltage output;

a voltage sensor providing a signal representing a magnitude of said low voltage;

stored acceptable values for said current signal and said voltage signal;

a microprocessor subsystem including hardware and software algorithms for providing a control signal to said control input responsive to fault indications of said current signal and said voltage signal from said established values to restore said current signal and said voltage signal to said stored acceptable values; and means for electrically isolating said microprocessor subsystem from said high electrostatic voltage output and said low voltage variable power supply;

whereby said microprocessor subsystem is able to safely maintain said high voltage electrostatic output operatively energized through said fault indications.

9. The power source of claim 8 wherein said microprocessor system calculates a current slew rate from said current signal, compares said current slew rate to a stored fold-back ceiling to provide a slew rate fold-back result, and adjusts said control signal responsive to said slew rate fold-back result.

10. The power source of claim 8 wherein said microprocessor system compares said current signal to a stored fold-back ceiling to provide a current fold-back result, and adjusts said control signal responsive to said current fold-back result.

11. The power source of claim 8 wherein said electrical isolating means further comprises distinct transformer windings, opto-isolators, relays and separate electrical grounding, whereby static discharge across a ground plane electrically connected to said high electrostatic voltage output is prevented from disrupting said microprocessor subsystem.

12. An apparatus for controlling power supplied to a high-voltage, low current output electrostatic device which provides fault detection and arc prevention, and which is adapted to varying environmental conditions and various applications, comprising:

a means for sensing a magnitude of said high-voltage, low current output from said electrostatic device and providing an output indication of said high-voltage, low current magnitude;

a means for discerning a status of an electrical condition that is indicative of a fault initiating event having as an input said output indication of said high voltage, low current magnitude and generating responsive thereto a discerning output signal representing said status of said electrical condition indicative of a fault initiating event; and a variable power supply having a control input responsive to said discerning output signal and producing an output which varies responsive to said control input to mitigate said fault initiating event while still outputting power;

said high-voltage, low current output operative and simultaneously responsive to said variable power supply output;

whereby, when said discerning output signal indicates said fault initiating event, said variable power supply adjusts said variable power supply output responsive thereto, thereby adjusting said high-voltage, low current output to mitigate said fault initiating event and thereby actively avoid arcs and other damaging fault conditions during continuous operation of said electrostatic device.

13. The apparatus for controlling power supplied to an electrostatic device of claim 12 further comprising a means for measuring a magnitude of said variable voltage output and providing an output representative of said magnitude.

14. The apparatus for controlling power supplied to an electrostatic device of claim 13 wherein said discerning means comprises a microprocessor system having hardware, programs and control parameters, and which generates said discerning output signal responsive to said measuring means output, said sensing means output indication, said control parameters, and said programming.

15. The apparatus for controlling power supplied to an electrostatic device of claim 14 further comprising a user interface for entering said control parameters and receiving status indication.

16. The apparatus for controlling power supplied to an electrostatic device of claim 14 wherein said microprocessor system further comprises a means for testing said high voltage, low current output electrostatic device in combination with said power controlling apparatus at a sub-operational power level.

17. The apparatus for controlling power supplied to an electrostatic device of claim 14 further comprising a reset controller having a reset input from a user interface, a reset output to said microprocessor system for resetting said microprocessor system, and a watchdog circuit receiving input from a decoder for resetting said microprocessor system in the event said microprocessor system becomes trapped in an indefinite loop or otherwise freezes.

18. The apparatus for controlling power supplied to an electrostatic device of claim 12 further comprising:

a fault relay between said variable power supply output and said high-voltage, low current output electrostatic device having a fault relay control input which, when activated, electrically passes said variable power supply output to said high-voltage, low current output electrostatic device and, when de-activated, electrically isolates said variable power supply output from said high-voltage, low current electrostatic device;

a means for testing said variable power supply output response to said discerning output signal when said fault relay is de-activated; and a means for de-activating said fault relay from the start of application of power to said apparatus during system start-up until after said testing means tests said variable power supply.

19. The apparatus for controlling power supplied to an electrostatic device of claim 12 further comprising means for electrically isolating said discerning means from said variable power supply.

20. The apparatus for controlling power supplied to an electrostatic device of claim 19 wherein said means for electrically isolating comprises an opto-isolator.

21. The apparatus for controlling power supplied to an electrostatic device of claim 12 wherein said discerning output signal is a digital word.

22. A method for preventing arcs or destructive fault conditions from damaging an electrostatic device powered by a variable power supply, comprising the steps of:

establishing predetermined limits for parameters of said variable power supply sensed responsive to selected controls input to said variable power supply;

disconnecting said variable power supply from said electrostatic device for high voltage applications;

inputting said selected controls to said variable power supply subsequent to said disconnecting step;

sensing said parameters of said variable power supply responsive to said inputting step to yield sensed parameters results;

comparing said sensed parameters results to said predetermined limits to produce a comparing result indicative of whether said sensed parameters results are outside of said predetermined limits; and disabling said electrostatic device if said comparing results are indicative of said sensed parameters results being outside of said predetermined limits.

23. A method for preventing arcs or destructive fault conditions from damaging an electrostatic device, comprising the steps of:

establishing predetermined limits for parameters of said electrostatic device sensed responsive to selected controls input to a variable power supply;

disconnecting said variable power supply from said electrostatic device;

inputting said selected controls to said variable power supply subsequent to said disconnecting step to generate a sub-operational voltage;

connecting said sub-operational voltage from said variable power supply to said electrostatic device subsequent to said inputting step;

sensing said parameters of said electrostatic device responsive to said connecting step to yield sensed parameters results;

comparing said sensed parameters results to said predetermined limits to produce a comparing result indicative of whether said sensed parameters results are outside of said predetermined limits; and disabling said electrostatic device if said comparing results are indicative of said sensed parameters results being outside of said predetermined limits.

24. An apparatus for controlling power supplied to a high-voltage, low current output electrostatic device which provides fault detection and arc prevention, and which is adapted to varying environmental conditions and various applications, comprising:

a means for sensing a magnitude of said high-voltage, low current output from said electrostatic device and providing an output indication of said high-voltage, low current magnitude;

a means for discerning a status of an electrical condition that is indicative of a fault initiating event having as an input said output indication of said high voltage, low current magnitude and generating responsive thereto a discerning output signal representing said status of said electrical condition indicative of a fault initiating event; and a means for electrically isolating said discerning means from said high-voltage, low current output electrostatic device wherein said isolation means prevents ground noise and electrostatic discharges generated within the electrical circuit of said high-voltage, low current output electrostatic device from disrupting said discerning means.

* * * * *